United States Patent [19]

Slavin

[11] 4,366,839

[45] Jan. 4, 1983

[54] MATERIAL PROCESSING APPARATUS

[75] Inventor: James A. Slavin, East Windsor, N.J.

[73] Assignee: Nolte and Nolte, P.C., Jericho, N.Y.

[21] Appl. No.: 233,131

[22] Filed: Feb. 12, 1981

Related U.S. Application Data

[63] Continuation-in-part of Ser. No. 123,853, Feb. 22, 1980.

[51] Int. Cl.$^{3}$ .............. F16K 5/00

[52] U.S. Cl. .............. 137/625.11; 137/874; 251/134

[58] Field of Search .............. 137/625.11, 616.3, 616.7, 137/874, 554, 556; 251/134

[56] References Cited

U.S. PATENT DOCUMENTS

| | | | |
|---|---|---|---|
| 406,447 | 7/1889 | Kennedy, Jr. | 137/874 |
| 2,888,098 | 5/1959 | Florence | 137/625.11 |
| 2,974,681 | 3/1961 | Whitehurst | 137/625.11 |
| 3,762,664 | 10/1973 | Loveless | 137/874 |
| 3,837,360 | 9/1974 | Bubula | 137/625.11 |
| 3,868,715 | 2/1975 | Slavin | 137/625.47 |
| 3,972,350 | 8/1976 | Pickett | 137/625.11 |
| 4,083,290 | 4/1978 | Andres | 137/625.11 |
| 4,099,704 | 7/1978 | Okumura et al. | 251/134 |
| 4,139,355 | 2/1979 | Turner et al. | 251/134 |

FOREIGN PATENT DOCUMENTS

| | | | |
|---|---|---|---|
| 909953 | 11/1962 | United Kingdom | 137/625.11 |

*Primary Examiner*—H. Jay Spiegel
*Attorney, Agent, or Firm*—Nolte and Nolte

[57] ABSTRACT

A system for selectively dispensing and/or mixing or otherwise utilizing materials contained in respective storage tanks, including a material conveyance means, such as a pump, and a specialized selector valve programmably controllable to supply the materials to one or more processing containers in desired quantities and in a desired sequence.

7 Claims, 11 Drawing Figures

MATERIAL PROCESSING APPARATUS

This is a continuation-in-part of my copending application Ser. No. 123,853, filed Feb. 22, 1980.

BACKGROUND OF THE INVENTION

This invention relates to improvements in systems for automatically handling fluids, including reagents, mixture components, or other such fluids. The term "fluid" as used herein is intended to mean any substance that can be pumped, or conveyed through a tube, including slurries or fine powders that behave as fluids.

The most pertinent prior art presently known to applicant is his own U.S. Pat. No. 3,868,715.

SUMMARY

According to this invention, a pump and an improved selector valve means are arranged to direct selectively the flow between the storage tanks of one or more substances and one or more processing containers where the substances may be utilized sequentially or intermixed, as required. The pump may be reversible to remove used substances from the processing container or containers, for return to respective storage tanks for subsequent re-use, or for delivery to a sump or the like for disposal as waste. Two selector valves may be provided, one for selecting a storage tank and one for selecting a processing container, which may also be a tank. This arrangement enables separate operations, such as multiple batch photographic developing, to take place concurrently or in overlapping time periods in different processing containers. Additionally, several valves may be interconnected to perform more complex operations. A processing tank may also include means for supplying dry and/or heated air to material such as photographic film in the tank. Also removal of a fluid from a processing tank will cause a partial vacuum which aids in drying the product remaining in the tank. This partial vacuum also speeds up the process whereby the tank is refilled with a fluid.

The improved selector valve includes a base plate provided with a first aperture or port and a plurality of second ports disposed at points on a circle concentric with the first port, and a fluid conducting rotor arm extending radially from the first port and having a vertically articulable extension adapted, when lowered, to engage one of the second ports. A motor or stepping solenoid is arranged to rotate the rotor arm into alignment with the selected one of the second ports. Means are included for sensing such alignment, and for driving or drawing the extension downward into engagement with the second port. Further means are provided for sensing lack of such engagement, and preventing application of fluid in event engagement is not present.

For processes in which temperature is a factor, one or more of the storage tanks and/or processing containers may be immersed in a temperature-control bath, comprising a tank containing a working fluid, such as water, with heating and/or cooling means controlled by a temperature sensing device to maintain the bath at the desired temperature. The bath is provided with means for continually circulating the working fluid.

One or more of the processing containers may be provided with agitator means to maintain homogeneity of the fluid during processing. Fluid agitation is preferably accomplished by an ultrasonic generator mounted directly on the processing container. The transducer could be driven by a generator producing a signal having a complex waveform, in order to prevent formation of standing waves in the processing tank. Such standing waves are objectionable, for example, in photographic or x-ray processing processes, since they tend to produce streaks on the film.

The entire system, including selector valves, pump, air supply, temperature control, and agitator means is preferably controlled by a programmable digital device such as a microprocessor, which may be incorporated with a keyboard or other suitable input means as a part of the structure of the apparatus, or by a physically separate device such as a computer or mini-computer with suitable peripheral means for sensing conditions in the processing apparatus and starting and stopping the various functions.

DESCRIPTION OF PREFERRED EMBODIMENTS

Figure 1:
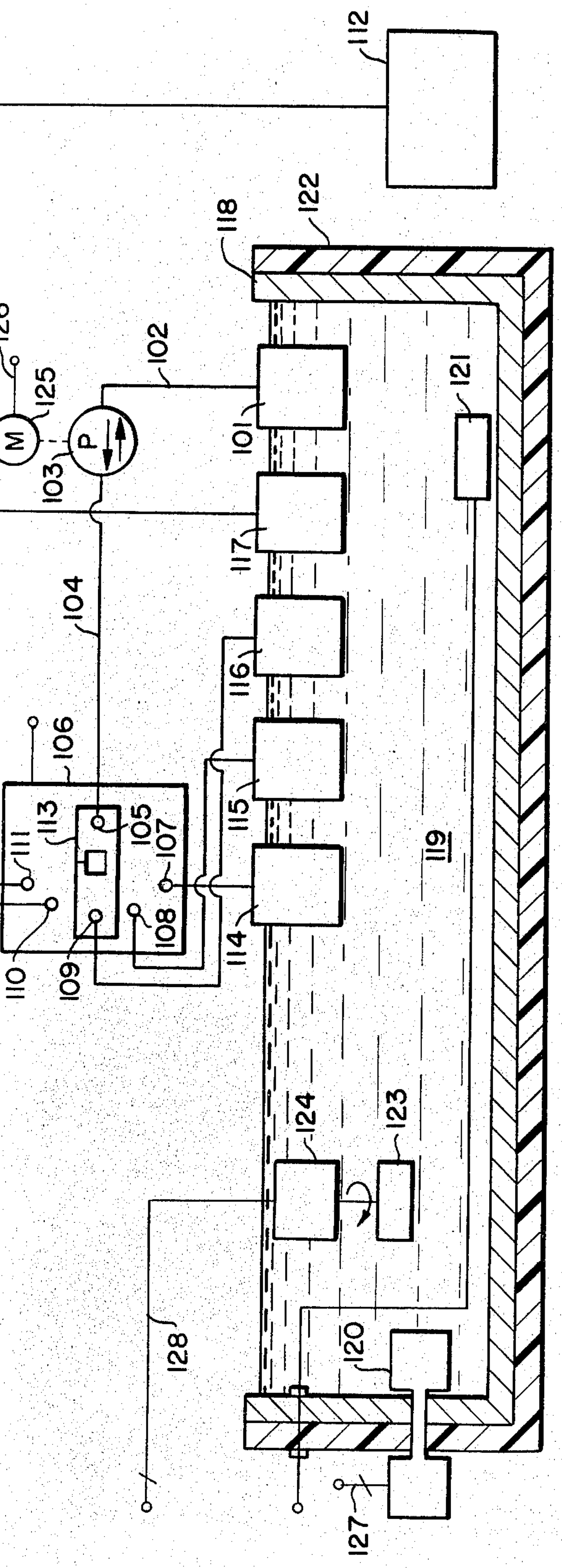
FIG. 1 is a schematic diagram of a fluid processing system according to the invention.

Referring to FIG. 1, a processing container 101, illustrated in this case as a tank, is connected by a fluid conduit 102 to a reversible pump 103, which in turn is connected by a conduit 104 to a first or common port 105 of a selector valve 106. Pump 103 is arranged to be driven by a reversible electric motor 125, which is controlled by signals from the control unit by line 126. Valve 106 is provided with a plurality of second ports 107–111 and a fluid conducting arm 113, rotatable about the common port 105 to selectively connect the common port 105 to any one of the second ports 107–111. In the valve position of FIG. 1, ports 105 and 109 are in fluid communication. The structure of valve 106 will be described later in more detail. The pump 103 may be a flexible impeller pump or a rotary vane pump.

Ports 107–110 are connected by respective conduits to fluid storage tanks 114–117, each adapted to contain a supply of a fluid to be utilized in the processing container 101. Port 111 of valve 106 is connected to a sump or waste receptacle 112. This sump might also be a container to be filled with the mixture in the processing tank. When the apparatus is to be used in temperature sensitive operations, such as photographic processing, tanks 114–117 may be immersed in a temperature-control bath comprising a tank 118 containing a working fluid 119, such as water, maintained at the desired temperature. In photographic processing removal of fluid from tank 101 will leave a partial vacuum that aids in drying the film and a separate source of heated air (not shown) may also be supplied. Such removal of fluid and subsequent formation of a partial vacuum also facilitates refilling the tank with fluid.

To this end, heating/cooling means, such as a Peltier effect thermoelectric device 120 is immersed in the tank and connected to be controlled by a temperature sensing device 121, which may be a thermistor, a thermostat, or an electrically connected thermometer. The exterior of the tank 118 may be covered by a layer 122 of thermal insulating material. An agitator 123 is arranged to be driven by a motor 124 to continually circulate the working fluid 119. Both the device 120 and the motor 124 may be under the control of the control unit via lines 127 and 128, respectively.

The apparatus of FIG. 1 is useful for a variety of purposes, from simple mixing, as in the preparation of beverages, to processes involving a series of chemical reactions, such as in the development of photographic film. The selector valve 106 and pump 103 are actuated and energized in a predetermined timed sequence to supply the several fluids as needed to the processing tank, to return reusable fluids to the respective storage tanks, and to discard nonreusable fluids to the sump, or to fill containers with the mixture in the processing tank.

The pump 103, must be a self-priming pump and must be capable of delivering fluids in either direction. The rotary vane pump is suitable for such use, as is a flexible impeller pump.

Because the system of FIG. 1 is intended to be controlled by a programmed control module, the several electrical units, such as the valve 106, the pump motor 125, the agitator driver 124 and the heater/cooler 120 are shown having electrical connections for connection to the control module.

Figure 2:
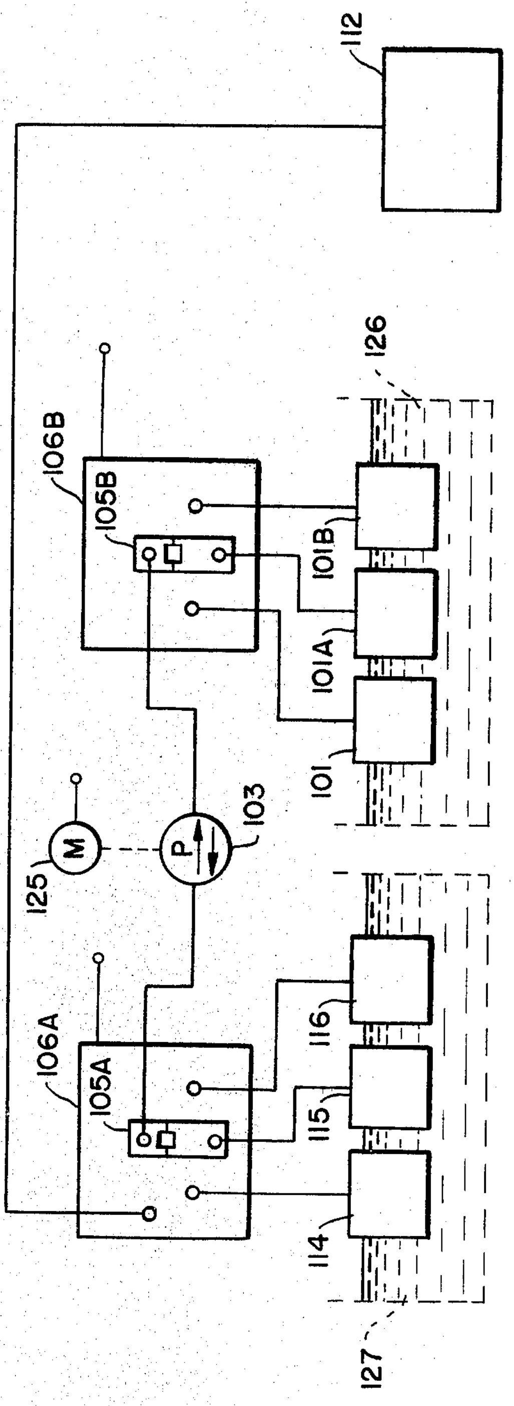
FIG. 2 is a modification of the system of FIG. 1.

Referring to FIG. 2, two or more fluid processing operations may be carried out contemporaneously by providing two selector valves 106A and 106B, each similar or identical to valve 106 of FIG. 1. The first or common ports 105A and 105B are connected to each other through the pump 103. A plurality of processing tanks 101, 101A and 101B are connected to respective second ports of valve 106B. Fluid supply tanks 114, 116 and any others, not shown, as needed, are connected to respective second ports of valve 106A. A sump 112 may be provided as in the embodiment of FIG. 1.

When operations are to be performed which are temperature dependent, fluid baths may be employed, and separate baths may be added as required or all processing and storage tanks may be contained in the same bath. In FIG. 2, a separate bath shown schematically at 126, is provided for the processing tanks 101, 101A, and 101B. Similarly, a separate bath 127 may be provided for the supply tanks 114, 115, 116. It is understood that as many baths may be supplied as separate temperatures are required or all processing and storage tanks may be contained in the same bath. Each bath can have all the elements of the bath shown in detail in FIG. 1.

Figure 3:
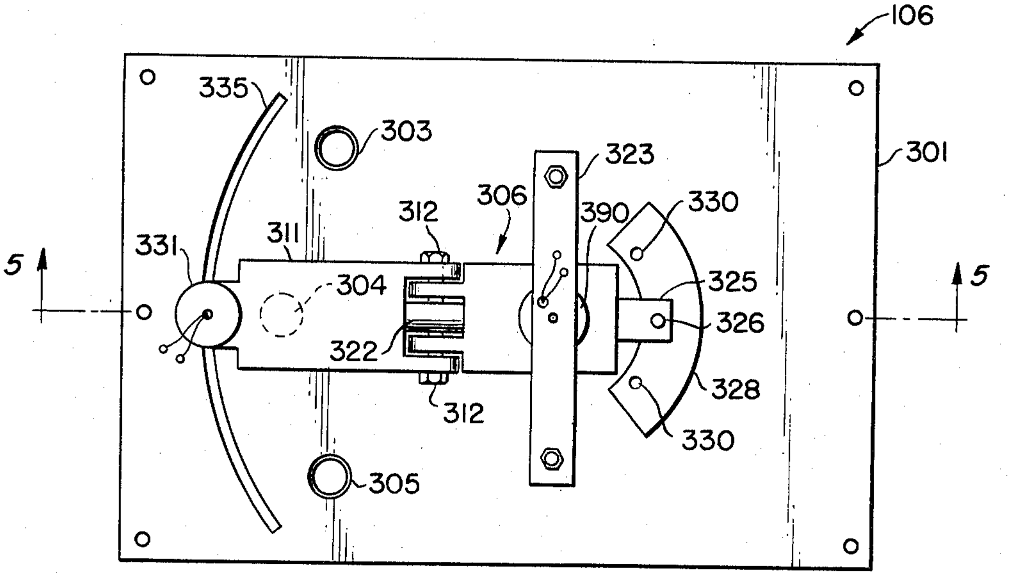
FIG. 3 is a top plan view of a selector valve used in the systems of FIGS. 1 and 2.
Figure 4:
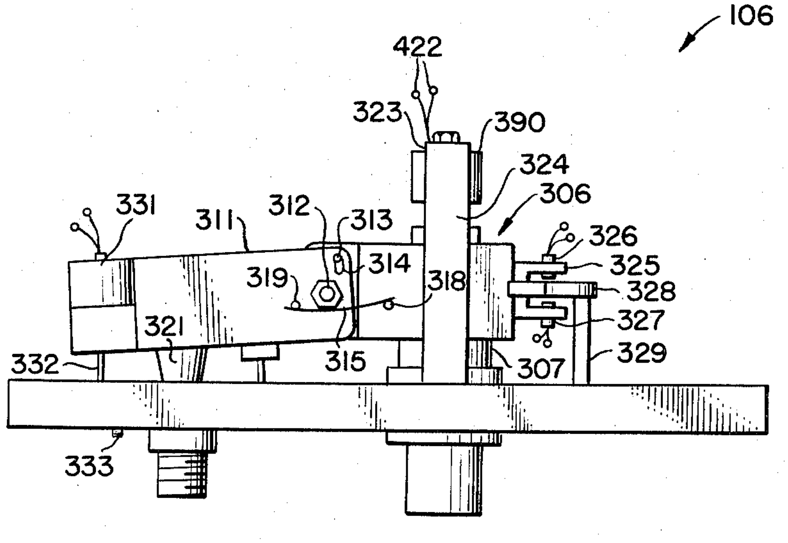
FIG. 4 is a side elevational view of the valve of FIG. 3.
Figure 5:
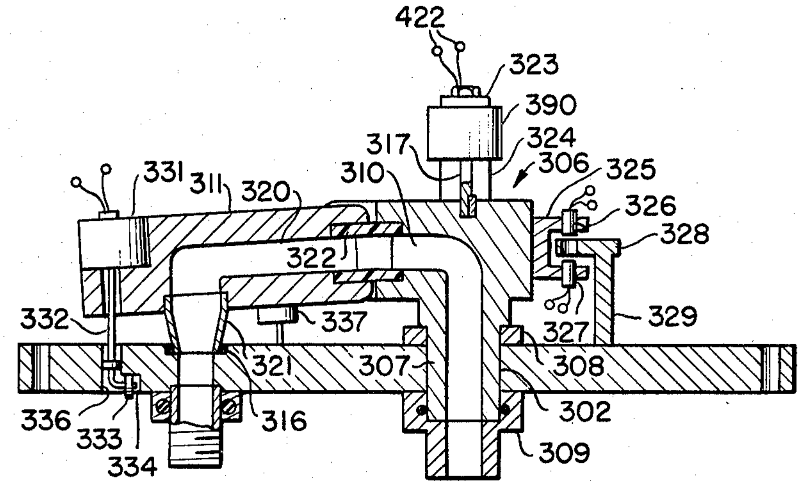
FIG. 5 is a side elevational view in cross section, taken along line 5—5 of FIG. 3.

Referring now to FIGS. 3, 4 and 5, the selector valve 106 of FIG. 1 includes a base plate 301 provided with a first aperture 302 and a plurality of second apertures 303, 304 and 305 disposed on the circumference of a circle concentric with aperture 302. A rotor arm assembly 306 is provided with a downwardly extending tubular member 307 rotatably mounted in aperture 302. Longitudinal motion of member 307 is restrained by a shoulder on the arm abutting a collar 308 disposed above the plate 301 and a collar 309 secured to it below plate 301. Collar 309 can include seal means, such as an O-ring, so that a fluid-tight seal is provided. The collar 309 provides a suitable connection to the appropriate fluid tube, not shown. Arm 306 contains a fluid passage 310 to the upper end of tubular member 307 extending radially outward therefrom.

The rotor arm assembly 306 includes a radial outward extension 311 mounted on hinge pins 312 for vertical articulation with respect to the inner, or right hand part of the arm. The extent of vertical motion is limited by a pin 313 on the inner part and a slot 314 on the extension 311. Each hinge pin 312 supports a spring 315 with tails engaging pins 318 and 319 on the inner and outer arm members to bias the extension 311 to its upward position. Extension 311 contains a fluid passage 320 that extends downwardly at its outer end and terminates in a fitting 321 beveled at its lower end to form a fluid tight connection with any of the second apertures 303 through 305. The second apertures contain a seal means 316 which cooperates with the lower surface of the tapered element 321 to form a fluid-tight seal. In this manner a seat is formed in the plate 301 to accomodate the beveled end of fitting 321.

The radially inner end of passage 320 is coupled to the outer end of passage 310 by a flexible tube 322. This tube 322 permits relative motion between the portions of the arm assembly 306.

A motor 390 is secured on a shelf 323 supported above the inner end of rotor arm 306 by uprights 324 from the base plate 301. The motor 390 may be an electrically operated motor or a pneumatic or hydraulic motor. The motor shaft 317 is coupled to the rotor arm so as to rotate it about a vertical axis concentric with the tubular member 307 when the motor is energized. Although FIG. 5 is a cross sectional view taken along line 5—5 of FIG. 3, the motor 390 has not been shown in cross section in the interest of clearness and simplicity. The motor 390 can be a conventional stepping motor, a rotary solenoid, or a synchro motor. The rotation of motor 390 is under the control of the control unit via signals on leads 422.

The right-hand end of arm 306 carries a bifurcated tail 325 containing a downwardly directed light source 326 in its upper leg, and an upwardly looking light detector 327 in its lower leg. An arcuately shaped mask member 328 supported on uprights 329 extends between source 326 and detector 327. The mask is provided with transparent regions or apertures 330 disposed to allow light to reach the detector 327 only when the rotor arm 306 is in a position such that fitting 321 is in alignment with one of the plurality of second apertures 303 through 305. This alignment is sensed by the detector 327 and the information fed to the control unit. It is understood that this position detection function could be achieved by any of several different approaches. For example, instead of sensing light transmission, light reflection could be used and the detector could be mounted along side of the light source. Alternatively, a microswitch and detent arrangement could be used, as could a magnetic sensor arrangement. Additionally, when employing a stepping motor, it is not necessary to sense valve alignment since the position of the rotor will be known by sensing the indexing of the stepping motor.

A solenoid 331 is mounted near the outer end of extension and has a plunger rod 332 with L-shaped lower end 333 having a hardened wheel 334 rotatably affixed thereto. The wheel 334 acts as a cam follower and rides in a groove 334 formed in the plate 301. The plunger 333 passes through the plate 301 by an arcuately shaped slot 335 formed integrally with the arcuate groove 334. A wheel-like bushing 336 may be located around the plunger rod 332 and located within the arcuate slot 335. When the solenoid 331 is energized, it overcomes the force of the springs 315 and since the plunger 332 can not move upward the coil of the solenoid moves and pulls the extension 311 downwardly, in order to engage firmly the tapered element 321 with the seat of the corresponding second aperture. Although FIG. 5 is a cross-sectional view, the solenoid 331 has not been shown in cross-section, in the interest of clarity and simplicity. The rod 332 is retained within the solenoid 331 in the known manner so that with the solenoid power off the rod will not fall away. Additionally, detent notches can be formed in groove 334 to aid in indexing the rotatable arm 306.

A plunger actuated switch 337 of known design is mounted on the lower side of extension 311, with its plunger pointed down so as to be pushed in by the base plate 301, when extension 311 is in its lower position. This closes the switch 337. The plunger is released when the extension 311 is in its upper position, to open the switch. Switch 337 can be a micro-switch or any other type of simple spring-loaded switch. This switch 337 or some equivalent mechanism is an important element in the embodiment being described, since it is absolutely necessary to know whether the extension 311 is in its lowered position, so that the pump will not be energized unless sealing contact has been made.

Figure 6:
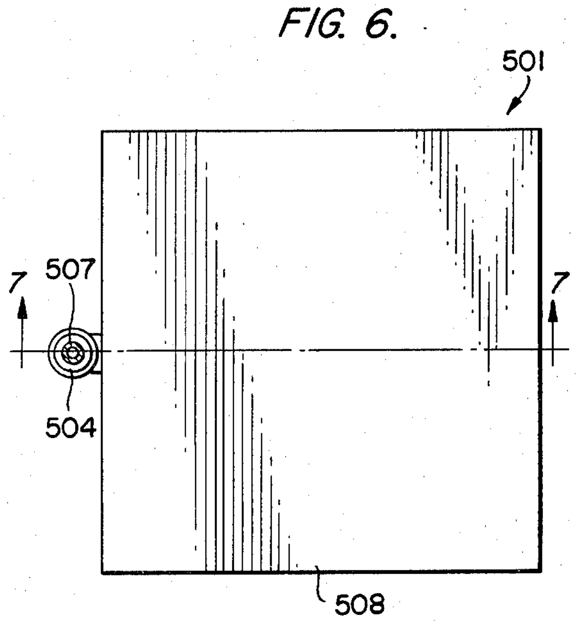
FIG. 6 is a top plan view of a tank, used in the embodiment of FIGS. 1 or 2.
Figure 7:
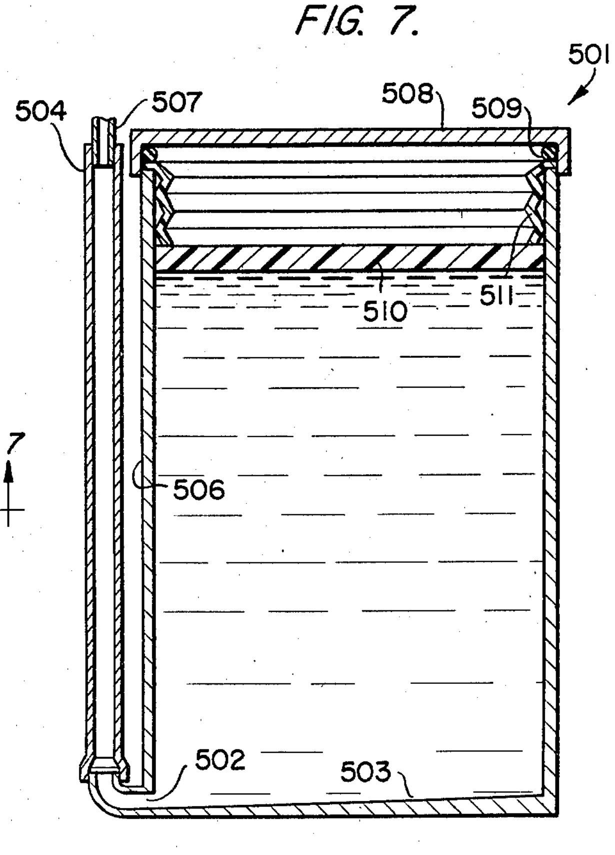
FIG. 7 is a sectional view in elevation of the tank of FIG. 5 taken along line 7—7.

Referring now to FIGS. 6 and 7, a fluid storage tank 501, typical of tanks 114–117 of FIG. 1, is provided with an opening 502 in one of its side walls at the bottom of the tank. The bottom wall 503 may slope slightly downward toward the opening 502 to facilitate removal of all fluid contained in the tank 501. A tube 504 is connected at its lower end to the interior of the tank through opening 502, and extends vertically up the outside of side wall 506, terminating near the top of the tank in a fitting 507 for attachment to a fluid conduit. This tube 504 could as easily be arranged inside the tank.

The tank 501 is provided with a removable light-tight airtight cover 508 with a resilient seal 509 for engagement with the peripheral upper edges of the tank. To further protect fluid in the tank from exposure to air, a float 510 is arranged to ride on the upper surface of the fluid. A bellows 511 is secured to the upper surface of float 510 and the inside surface of cover 508.

Figure 8:
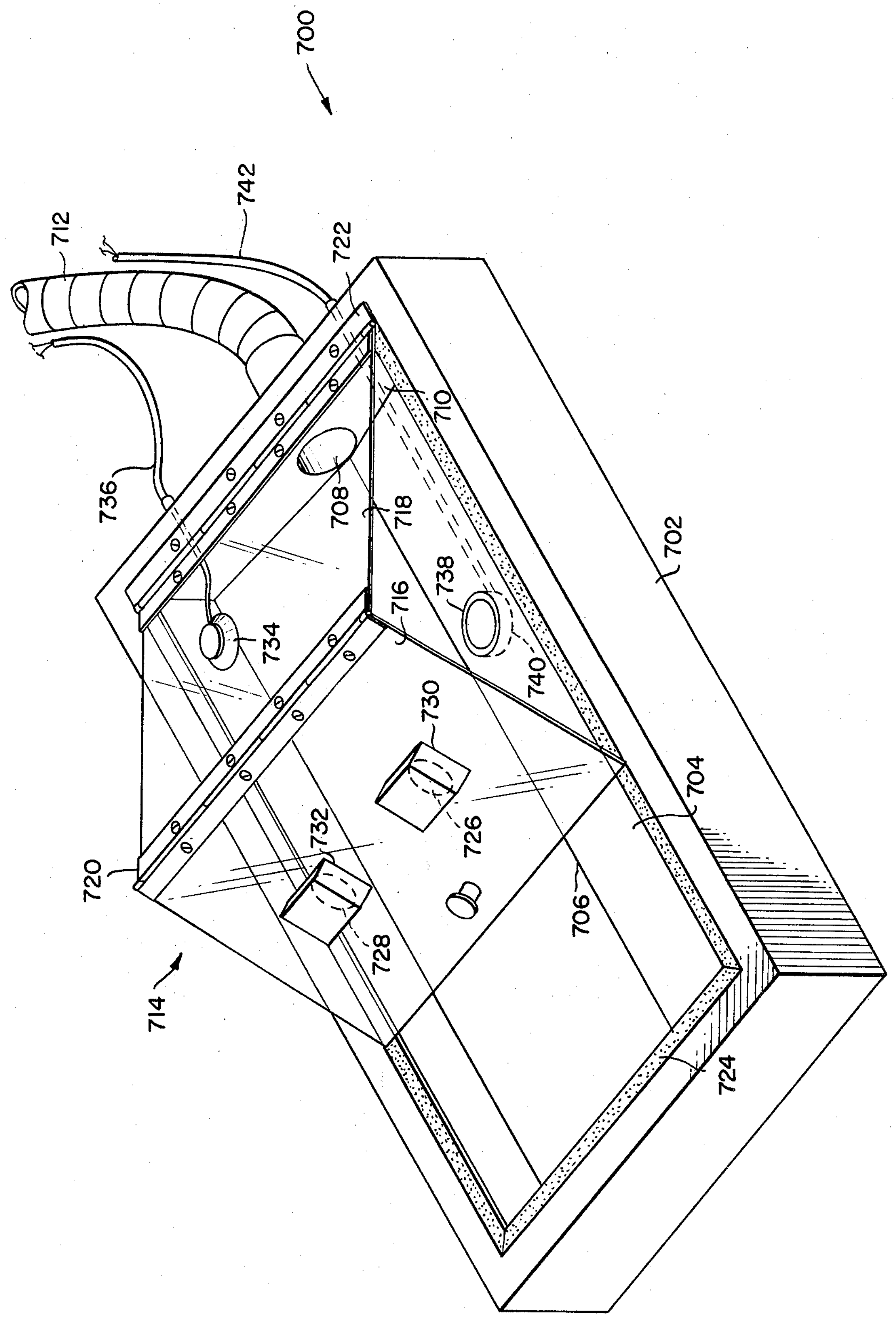
FIGS. 8 is a perspective of a processing tank for use in the systems of FIGS. 1 and 2.

Referring to FIG. 8, a processing tank 700 in this embodiment particularly adapted for photographic or X-ray film processing is shown in perspective. The tank 700 has a main tank body portion 702 which has its bottom 704 sloping downward along its centerline 706 and also toward an opening 708 formed in the rear wall 710 of the tank body 702. This opening 708 is connected by a main flexible tube 712 to the valve assembly, as shown in FIGS. 3, 4, and 5. All fluids are fed into and drained from the tank through this tube 712, and it can also be used as a conduit for air to dry the contents of the tank.

The tank is provided with a hinged cover 714 formed in two segments 716, 718 connected to each other by a hinge 720. Another hinge 722 attaches the cover 714 to the tank body 702. Although in FIG. 8 the hinged cover 714 appears transparent it is advantageously of transparent red filter material to block all light save red to which most black and white and X-ray films are insensitive. Alternatively, the segments 716 and 718 can be opaque or an additional opaque hood or shield can be provided.

The hinged cover 714, in its closed position forms a gas-tight fit with the body member 702 and a gasket or seal 724 may be disposed along the inner edge of the opening in the body 702 to aid in forming such seal. The cover 714 and body 702 are in an air-tight relationship when the interior is being evacuated, however, when there is an increase of pressure in the tank relief valves are provided to alleviate such pressures. Two check valves or vents 726, 728 are arranged in the cover segment 716 and each is provided with a light baffle 730, 732, respectively. In any event, care must be taken to make the processing tank airtight so that a partial vacuum can be formed therein to obtain the benefits discussed above.

Certain photographic processes require an additional light exposure during processing and to accomodate this an electric lamp 734 is mounted to the inside of cover segment 718 and the appropriate electrical cable 736 is fed through the rear wall 710 and fed back to the valve and control assembly along with tube 712.

In order to improve processing time and improve wash quality it is known to agitate the fluid. The present invention provides ultrasonic agitation and the transducer for such agitation is affixed to the bottom 704 of the tank 702 at 738. The transducer 738 may be an electromagnetic, magneto-strictive, or piezoelectric device of the known type and the generator 740 located below the bottom wall 704. In some instances it may be desirable to use a random wave form to eliminate the production of standing waves, which may be detrimental to photographic processing. The ultrasonic generator is powered and controlled by an appropriate electrical cable 742, fed through the rear wall 710 and back to the valve and control assembly along with the tube 712 and the light cable 736.

Figure 9:
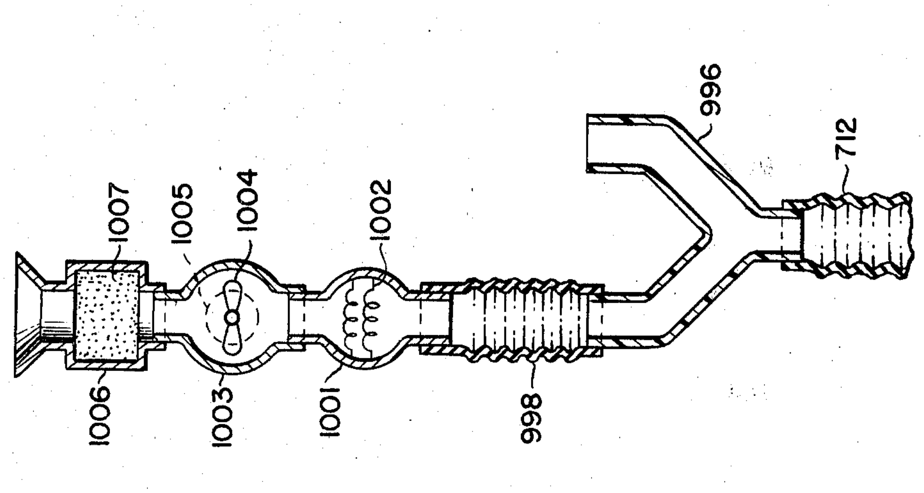
FIG. 9 shows apparatus for blowing dried and/or heated air into the tank of FIG. 8.

Referring to FIG. 9 hose 712 may be also connected through a Y or other suitable connector 996 to apparatus for supplying dried and/or heated air to the processing tank. The other arm of this Y connector 996 goes to the valve assembly for supplying and removing fluids. Suitable one-way valves (not shown) may be incorporated in the Y connector 996 to insure proper direction of the air and liquids. Additionally, it should be noted that it is also contemplated to run the pump dry and to use it alone to supply the air for drying. In any event, in FIG. 9, hose 998 is connected between one arm of the Y connector 996 and an enclosure 1001 containing an electric heating element 1002 to a blower 1003 with an impeller 1004 arranged to be driven by an electric motor 1005. External air is admitted to the blower through a container 1006 of dessicant 1007 which may be, for example, a particulate silica gel or a zeolite.

Figure 10:
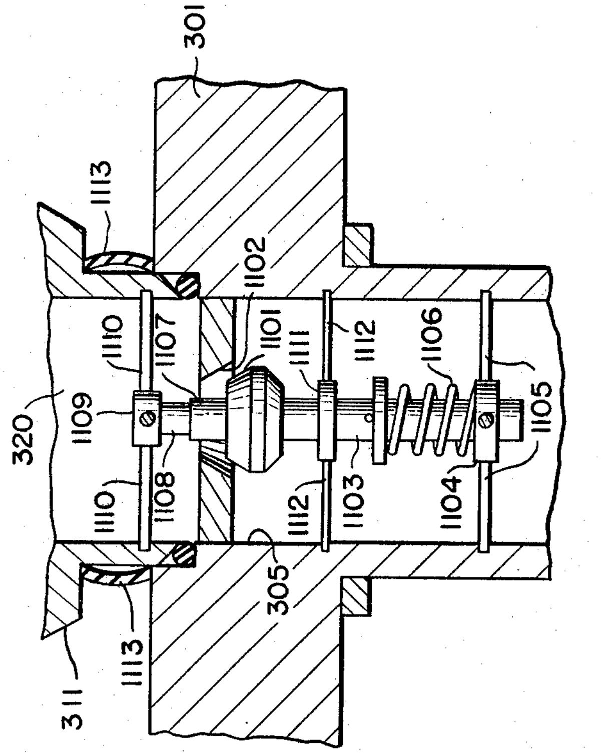
FIG. 10 is a partial section of a poppet valve and actuator arrangement for use with the selector valve of FIGS. 3, 4, and 5.

Referring to FIG. 10 one or more of the second ports or apertures of the selector valve of FIG. 3, for example 305, may be provided with a poppet valve including conical member 1101 cooperating with a valve seat 1102. Member 1101 is supported on a stem 1103 extending downwardly and slidably through a bushing 1104 supported on struts 1105. A coil spring 1106 surrounding step 1103 urges member 1101 toward its upward, valve closing position.

A second stem 1107 extends upwardly from member 1101 for engagement with a valve operating pin 1108 secured in a collar 1109 supported inside fitting 321 by struts 1110. When the inventive selector valve arm extension is lowered, as shown, pin 1108 forces stem 1107 downward, opening the valve. Another bushing 1111 and struts 1112 arrangement maintains the alignment of the valve stem 1103 during actuation. A resilient boot 1113 surrounds fitting 321 to prevent entry of ambient air while the valve is partially open and the beveled lower end of fitting 321 is not in engagement with the O-ring seal in the aperture.

Figure 11:
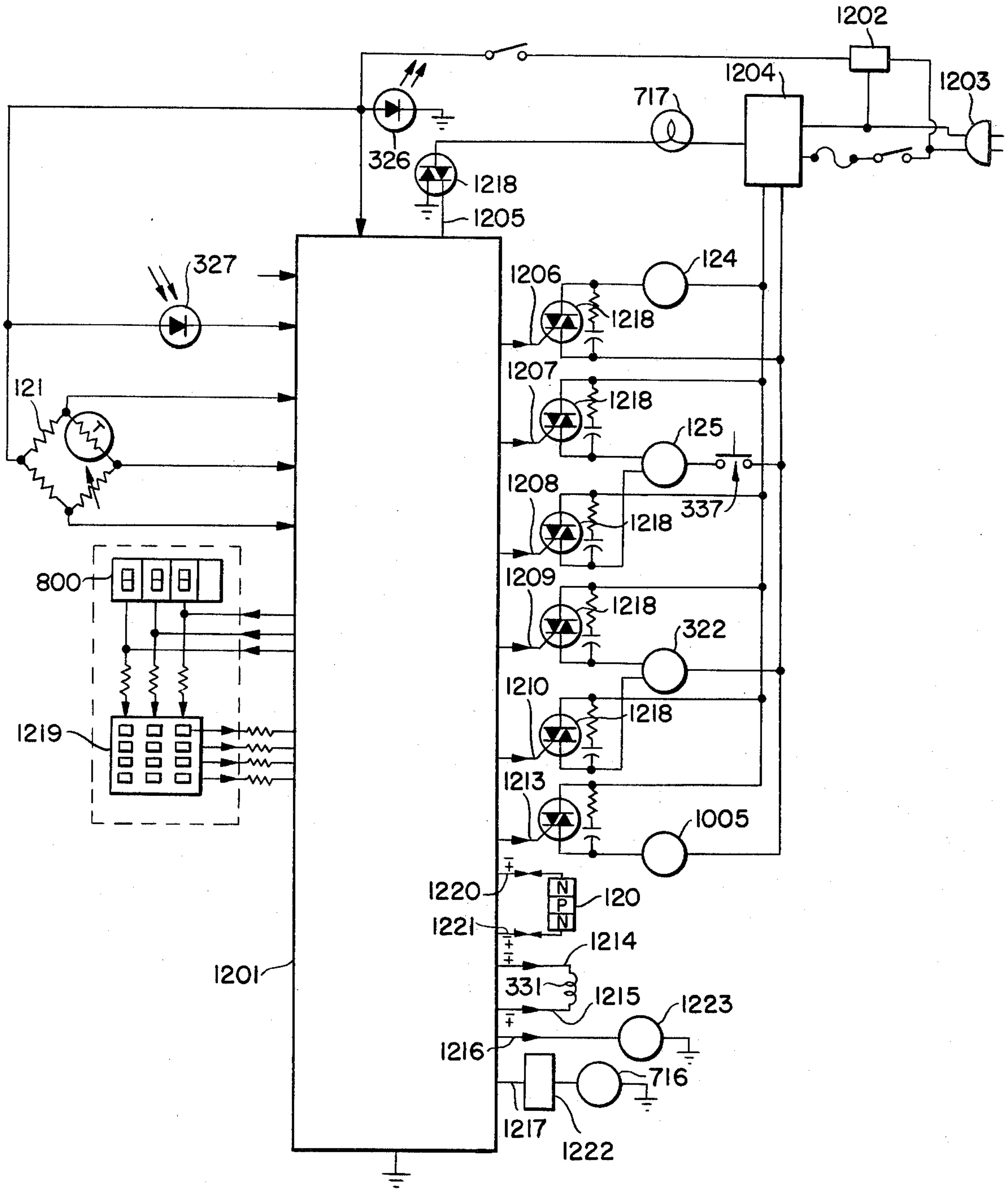
FIG. 11 is a schematic diagram of the electrical circuits and control apparatus for the systems of FIGS. 1 and 2.

Referring to FIG. 11, a programmable digital device 1201, which may be a computer or an assembly including one or more microprocessors, is arranged to control energization of respective electric motors driving the mechanisms of the described systems, and energization of other electrically operated elements thereof. The device 1201 is itself energized by a regulated power supply 1202 adapted to be connected to the usual a-c line by a plug 1203. A separate power supply 1204 for the various motors and other elements may also be connected to plug 1203.

Device 1201 includes a clock-signal generator which, in accordance with a suitable program entered in the device 1201, provides electrical outputs or strobes at the appropriate times on respective output lines 1204–1217. The device 1201 may be programmed by any conventional means, such as a manually operable keypad 1219. An illuminated digital readout 800 may also be employed which will provide a visual indication of the information manually fed in by keypad 1219. This readout unit 800 can also be used to provide information about certain malfunction states present in the microprocessor.

Lines 1209 and 1210 supply control inputs to respective relay devices, shown here as conventional triac circuits 1218, to energize the selector arm drive motor 322 of FIG. 3. A signal on line 1209 causes the motor to rotate in one direction, and a signal on line 1210 causes it to rotate in the opposite direction. A signal indicating that the valve is correctly positioned is available when light from source 326 reaches detector 327 through one of apertures 330 in the assembly shown in FIGS. 3, 4, and 5.

Lines 1214 and 1215 are connected to solenoid 331 of FIG. 3. Lines 1207 and 1208 supply inputs to respective relay devices 1218 for energizing the reversible pump motor 125 to run in the selected direction. Switch 337 prevents energization of motor 125 except when the selector valve arm is in engagement with one of the second ports.

Line 1206 controls fluid bath agitator motor 124 by way of a relay device 1218. Line 1205 is similarly arranged to control processing tank lamp 717.

Temperature sensor 121 is shown as a conventional termistor bridge circuit providing an input to digital device 1201. A desired set-point temperature may be entered by keypad 1219. Output lines 1220 and 1221 energize Peltier device 120 in one polarity for cooling and in the opposite polarity for heating the temperature control bath. Line 1217 operates a complex wave form generator 1222 driving the ultrasonic wave transducer 716 for agitating the contents of the processing tank of FIG. 9. The control module might also operate transducer 716 directly, via line 1217. Line 1216 energizes an alarm device 1223 when a process is completed or some condition occurs requiring the attention of an operator. The alarm condition can also be indicated on the digital readout device 800.

It is understood that the foregoing is presented by way of illustration only and is not intended to limit the scope of the present invention, except as set forth in the appended claims. For example, when using a rotary vane pump, which is capable of pumping both fluids and gases, one of the secondary ports in the valve may be connected to a source of air for drying the material in the processing tank. In this manner the pump which is used for fluid transfer is also run dry and used to pump in drying air to the processing tank.

What is claimed is:

1. A selector valve, comprising:

(a) a base plate having a first aperture constituting a first port and a plurality of second apertures constituting second ports disposed on the circumference of a circle concentric with said first aperture.

(b) a rotor arm extending radially from said first port and mounted on said base plate for rotation about the center of said first port, said rotor arm including a material passage and means providing a fluid-tight connection between the radially inner end of said passage and said first port, (c) said rotor arm including a radially outward extension that is vertically articulated and contains a material passage connected by flexible fluid-tight means to the outer end of said first material passage and terminating at its outer end in an orifice adapted to engage one of said second ports in fluid-tight relationship, (d) means normally biasing said articulated extension upwardly and out of contact with said base plate and second ports, (e) means for rotating said rotor arm to a selected angular position with said orifice in alignment with a selected one of said second ports, (f) means for sensing such alignment, and (g) means responsive to said sensing means for urging said extension downward to engage said orifice with said selected second port and maintain such engagement.

2. The apparatus of claim 1, including further means for sensing lack of engagement of said orifice with a second port, and means responsive thereto for preventing application of material to said apparatus.

3. The apparatus of claim 1, wherein said biasing means includes a spring.

4. The apparatus of claim 1, wherein said means for urging said extension downward comprises a solenoid having means at the distal end of a plunger for engaging said base plate, whereby when said solenoid is energized said rotor arm is drawn downwardly.

5. The apparatus of claim 1, wherein said means for urging said extension downward comprises a solenoid mounted on said rotor arm and having a downwardly extending rod for cooperating with said base plate, whereby upon actuation of said solenoid said extension arm is urged downwardly.

6. The apparatus of claim 1, wherein said means for sensing such alignment comprises a first element connected to and movable with said rotor arm, and a second element fixed with respect to said base plate, one of said elements comprising a light detector and a light source directed at said detector, and the other of said elements comprising an opaque mask interposed between said light source and said light detector, said mask including transparent regions at points corresponding to the alignment of said rotor arm with a second port.

7. The apparatus of claim 1, wherein at least one of said second ports is provided with a poppet valve and means normally maintaining said poppet valve closed, and said rotor arm is provided with means for opening said poppet valve when said port is engaged by the orifice in the extension of said rotor arm.

* * * * *